United States Patent
Hong et al.

(10) Patent No.: US 9,851,002 B2
(45) Date of Patent: Dec. 26, 2017

(54) SHIFT CONTROL APPARATUS OF MANUAL TRANSMISSION

(71) Applicant: KYUNG CHANG INDUSTRIAL CO., Ltd., Daegu (KR)

(72) Inventors: Hyeong-Seok Hong, Daegu (KR); Dong-Won Kim, Daegu (KR)

(73) Assignee: KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 15/050,240

(22) Filed: Feb. 22, 2016

(65) Prior Publication Data
US 2016/0245395 A1  Aug. 25, 2016

(30) Foreign Application Priority Data
Feb. 25, 2015 (KR) ........................ 10-2015-0026445

(51) Int. Cl.
*F16H 59/04* (2006.01)
*F16H 61/18* (2006.01)
(Continued)

(52) U.S. Cl.
CPC ........... *F16H 59/044* (2013.01); *F16H 59/04* (2013.01); *F16H 61/16* (2013.01); *F16H 61/18* (2013.01);
(Continued)

(58) Field of Classification Search
CPC ............. F16H 61/18; F16H 2061/185; F16H 2061/165; F16H 63/34; F16H 61/16; F16H 2059/0269
(Continued)

(56) References Cited

U.S. PATENT DOCUMENTS 5,078,020 A * 1/1992 Hasegawa ............... F16H 61/16
74/473.22
5,857,938 A * 1/1999 Porter ..................... F16H 59/04
477/99
(Continued)

FOREIGN PATENT DOCUMENTS

CN 101797889 8/2010
CN 102463890 5/2012
(Continued)

OTHER PUBLICATIONS

Office Action for Chinese Patent Application No. CN 201610067882.2, Aug. 1, 2017, 15 Pages. (With English Translation).

*Primary Examiner* — Victor L MacArthur
*Assistant Examiner* — Bobby Rushing, Jr.
(74) *Attorney, Agent, or Firm* — Fenwick & West LLP (57) ABSTRACT

A shift control apparatus of a manual transmission is disclosed. To change the gear, the shift control apparatus of a manual transmission according to the embodiment of the present invention includes: a shift lever which is movable in a shift direction and in a select direction; a select lock unit which includes a shaft for limiting the select directional movement of the shift lever; and a controller which controls the select lock unit to limit the select directional movement of the shift lever on the basis of a speed of a vehicle. As a result, a driver can safely shift the gear by preventing unintended shifting to R gear and sense the state of a select lock. Also, the select lock unit is implemented by one solenoid, so that it is possible to reduce the cost thereof, to prevent the overheating of the solenoid, and thus, to extend the life span.

8 Claims, 10 Drawing Sheets

(51) Int. Cl.
*F16H 61/22* (2006.01)
*F16H 63/34* (2006.01)
*F16H 61/16* (2006.01)
*F16H 59/44* (2006.01)

(52) U.S. Cl.
CPC ......... *F16H 61/22* (2013.01); *F16H 63/3475* (2013.01); *F16H 59/44* (2013.01); *F16H 2059/048* (2013.01); *F16H 2061/165* (2013.01); *F16H 2061/185* (2013.01)

(58) Field of Classification Search
USPC ............................ 74/473.22, 473.34, 473.21
See application file for complete search history.

(56) References Cited

U.S. PATENT DOCUMENTS

| | | | | |
|---|---|---|---|---|
| 6,325,196 | B1* | 12/2001 | Beattie | F16H 59/0204 192/220.4 |
| 6,823,757 | B2* | 11/2004 | Kobayashi | F16H 61/32 335/266 |
| 7,393,304 | B2* | 7/2008 | Wilde | F16H 59/0217 477/94 |
| 8,556,772 | B2* | 10/2013 | Biallas | F16H 61/16 477/115 |
| 9,476,500 | B2* | 10/2016 | Skogward | F16H 59/04 |
| 2004/0226801 | A1 | 11/2004 | De Jonge et al. | |
| 2011/0036193 | A1* | 2/2011 | Ueta | F16H 59/0204 74/473.21 |
| 2013/0319156 | A1* | 12/2013 | Berger | F16H 59/08 74/473.11 |
| 2014/0069221 | A1* | 3/2014 | Ishida | F16H 63/34 74/473.22 |
| 2014/0373661 | A1* | 12/2014 | Benson | F16H 61/18 74/473.21 |
| 2015/0204443 | A1* | 7/2015 | Ryan | F16H 63/34 74/335 |

FOREIGN PATENT DOCUMENTS

| | | | | |
|---|---|---|---|---|
| CN | 102954201 | | 3/2013 | |
| DE | 4118930 | A1 * | 12/1992 | ............ F16H 61/18 |
| GB | 1531061 | A * | 11/1978 | ............ F16H 3/12 |
| JP | 1994-034211 | U | 5/1994 | |
| JP | 2013-184604 | A | 9/2013 | |

* cited by examiner

SHIFT CONTROL APPARATUS OF MANUAL TRANSMISSION

CROSS-REFERENCE TO RELATED PATENT APPLICATION

The present application claims the benefit of Republic of Korea Patent Application Serial No. 10-2015-0026445 filed on Feb. 25, 2015, the entirety of which are all incorporated herein by reference.

BACKGROUND

Field

The present disclosure relates to a shift control apparatus of a manual transmission, and more particularly to a shift control apparatus of a manual transmission, which is capable of limiting shifting to R gear when a gear is shifted while driving at a high speed.

Description of the Related Art

A transmission converts the power generated by an engine into a rotational force suitable for the speed of a vehicle, and transfers. The transmission is installed between a clutch and a propeller shaft. Since the driving condition of the vehicle varies widely, for example, stop, start, low-speed drive, high-speed drive, reverse drive, etc., the transmission must be able to maximize the performance of the engine in response to each of the driving conditions.

The transmission is divided into the most basic manual transmission, an automatic transmission, a continuously variable transmission (CVT), a double-clutch transmission (DCT), etc. Regarding the manual transmission, a driver should control the gear shift stage of the transmission himself/herself, and thus, he/she may feel inconvenient. However, the manual transmission has a simple structure and high efficiency.

In general, the gear shift of the vehicle is comprised of a forward gear shift from the first gear to fifth or more gear and a reverse gear shift of R (reverse) gear. In the first gear and the second gear which are low gears, a moderating ratio is set to be high in order to create a strong power. In the third gear and fourth gear which are medium gears, a shift ratio is set similar to the engine RPM so as to maintain the driving speed. Also, in the fifth or more gear which is high gear, the shift ratio is set lower than the engine RPM so as to drive at a high speed.

However, when a driver of a vehicle equipped with a conventional manual transmission moves a shift lever in the select direction excessively, reverse gear shift is performed many times instead of a high speed shift of the fifth or sixth gear, etc. In this case, an excessive force is added to the transmission, and thus, this is a cause of breakdown, for example, overload generation, etc.

SUMMARY

One embodiment relates to a shift control apparatus of a manual transmission that includes a shift lever which is movable in a shift direction and in a select direction; a select lock unit which includes a shaft for limiting the select directional movement of the shift lever; and a controller which controls the select lock unit to limit the select directional movement of the shift lever on the basis of a speed of a vehicle.

When the speed of the vehicle is in a predetermined speed range, the controller may control the select lock unit to limit the select directional movement of the shift lever.

Also, the predetermined speed range may correspond to a third gear or a fourth gear.

The select lock unit may include a solenoid which includes a permanent magnet fixed to the shaft, and a coil surrounding a circumference of the shaft in a cylindrical shape. The controller may control a current flowing through the coil and change a polarity of a magnetic field formed in the solenoid, so that the permanent magnet fixed to the shaft is moved.

The select lock unit may insert the shaft into a locking groove formed in a select lever, and thus, may limit the select directional movement of the shift lever.

Also, the shift control apparatus of a manual transmission may further include a magnetic field sensor which senses whether the select directional movement of the shift lever is limited or not.

The shaft 310 may include a position sensing magnet 350 provided on an end thereof. The magnetic field sensor 400 may sense a position of the shaft 310 on the basis of a magnetic field change depending on a distance change of the position sensing magnet 350.

Also, the magnetic field sensor may be composed of a hall integrated circuit (IC).

The controller may receive information on the speed of the vehicle from an electronic control unit (ECU).

Another embodiment is a shift control apparatus of a manual transmission that includes: a shift lever which is movable in a shift direction and in a select direction; a select lock unit which includes a shaft for limiting the select directional movement of the shift lever; and a controller which controls the select lock unit to limit the select directional movement of the shift lever on the basis of a gear shift stage.

When the gear shift stage corresponds to a predetermined gear shift stage, the controller may control the select lock unit to limit the select directional movement of the shift lever.

The predetermined gear shift stage may be a third gear or a fourth gear.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. Similar reference numerals in the drawings designate the same or similar functions in many aspects.

Also, in the components of the present invention, detailed descriptions of what can be clearly understood and easily carried into practice by those skilled in the art will be omitted to avoid making the subject matter of the present invention unclear.

Figure 1:
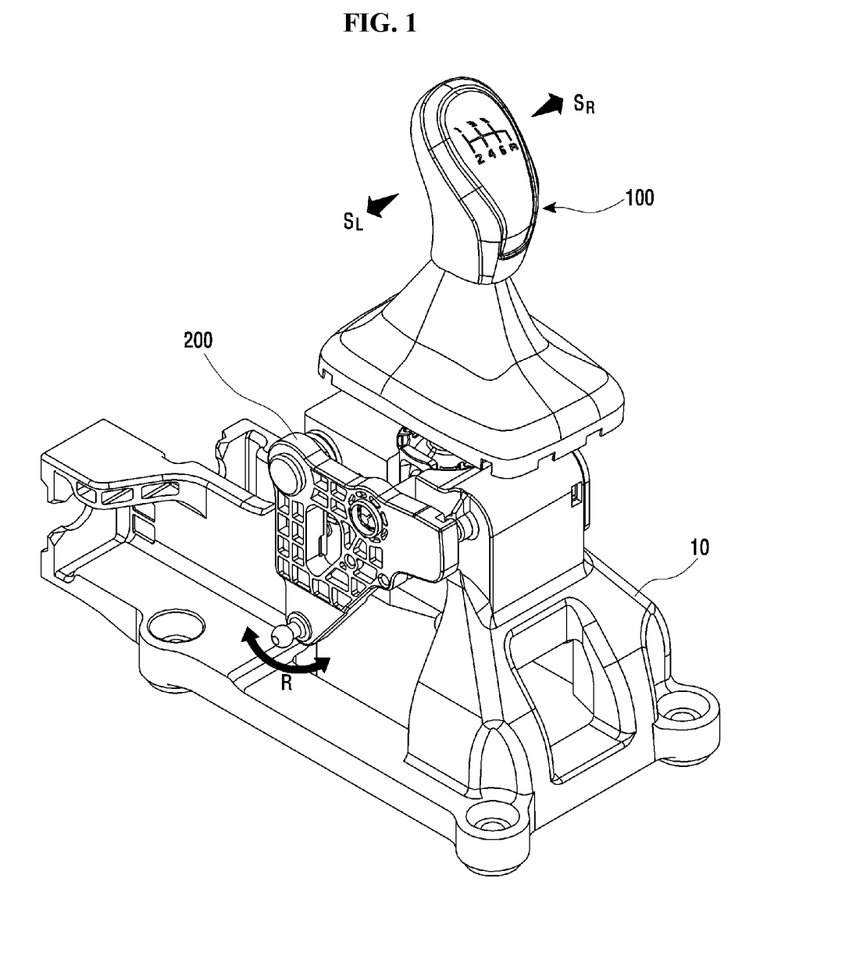
FIG. 1 is a perspective view of a shift control apparatus of a manual transmission according to an embodiment of the present invention.
Figure 2:
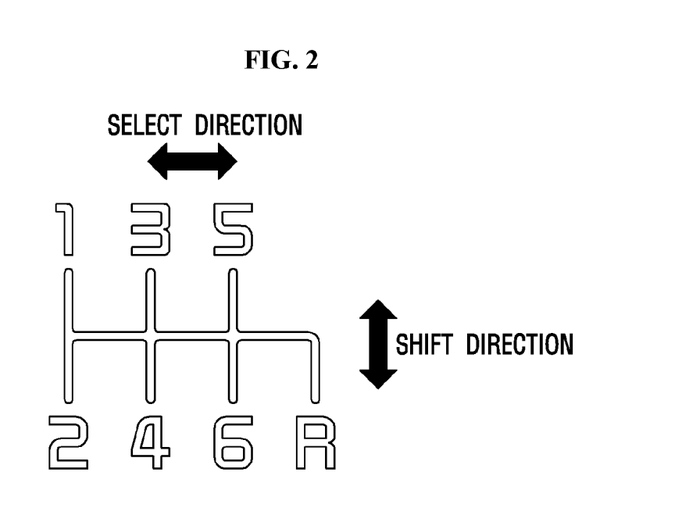
FIG. 2 is a view showing a shift pattern marked on a knob surrounding a shift lever in the shift control apparatus of a manual transmission according to the embodiment of the present invention.
Figure 3:
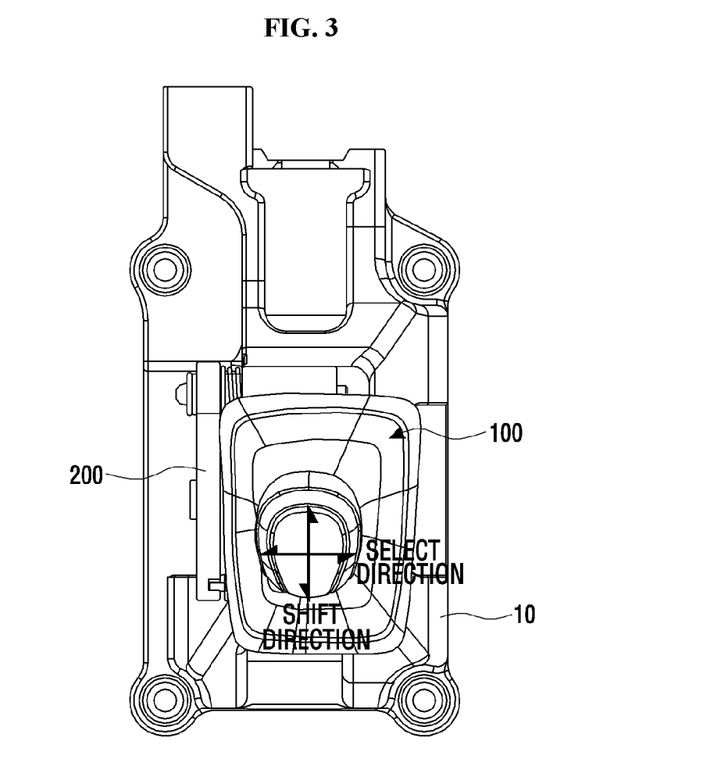
FIG. 3 is a plan view of the shift control apparatus of a manual transmission according to the embodiment of the present invention.

FIGS. 1 to 3 are views for describing a basic operation of a shift control apparatus of a manual transmission according to an embodiment of the present invention. FIG. 1 is a perspective view of the shift control apparatus of a manual transmission according to the embodiment of the present invention. FIG. 2 is a view showing a shift pattern marked on a knob surrounding a shift lever in the shift control apparatus of a manual transmission according to the embodiment of the present invention. FIG. 3 is a plan view of the shift control apparatus of a manual transmission according to the embodiment of the present invention.

As shown in FIG. 1, basically, the shift control apparatus of a manual transmission according to the embodiment of the present invention includes a base bracket 10, a shift lever 100, and a select lever 200.

The shift lever 100 is moved in a select direction or in a shift direction by the operation of a driver. The shift pattern shown in FIG. 2 may be formed in a knob of the shift lever 100. The driver controls a clutch (not shown) and the shift lever 100 in accordance with the speed of a vehicle, and changes the gear shift stage in accordance with the shift pattern.

Here, the following description will be provided by assuming that the gear shift stages that can be controlled by the shift control apparatus of a manual transmission according to the embodiment of the present invention are a total of six forward gear shifts of the first to sixth gear and a reverse gear shift of R gear. Also, it is apparent to those skilled in the art that the number of gear shift stages is not limited to this and a larger or smaller number of gear shift stages can be provided.

Generally, the transmission is installed between the clutch and final reduction gears/differential gears. The transmission changes the rotational torque and rotational speed of an engine and transfers to the final reduction gears/differential gears.

Transmission grading is as follows. A maximum shift ratio and a minimum shift ratio are determined by considering the maximum speed and climbing angle of the vehicle, and then the shift ratios of the medium gears are determined. Here, the shift ratio refers to each ratio of the gears at a point of time when the output of the engine, which has been generated by a crank shaft, is converted into a driving force within the transmission.

The driver controls the shift lever 100 and the clutch depending on the speed of the vehicle and changes the gear shift stage into a gear shift stage suitable for the speed. Each of the gear shift stages has its appropriate speed range.

For example, the first gear and the second gear are applied when the speed of the vehicle is less than approximate 40 km/h. The third gear and the fourth gear are applied the speed of the vehicle is approximate 40 km/h to 80 km/h. The fifth gear and the sixth gear are applied the speed of the vehicle is greater than approximate 80 km/h. Furthermore, according to the specification of the vehicle, the appropriate speed corresponding to each of the gear shift stages may be set to be different from that described above.

The driver should move the shift lever 100 in up, down, right and left directions shown in the shift pattern of FIG. 2 so as to change the gear shift stage. Here, the right and left direction of the shift pattern of FIG. 2 is referred to as the select direction, and the up and down direction is referred to as the shift direction.

When the speed of the vehicle traveling at the second gear speed increases and reaches a speed corresponding to the third gear, the driver steps on the clutch pedal and moves the shift lever 100 to the position 3 in the shift pattern.

Furthermore, when the speed increases and reaches a speed corresponding to the fourth gear, the driver steps on the clutch pedal and moves the shift lever 100 to the position 4 in the shift pattern.

As such, the driver cannot change the gear shift stage from the first gear to the sixth gear or to R gear by moving the shift lever 100 in the select direction or in the shift direction.

When the driver moves the shift lever 100 in the select direction (in $S_R$ and $S_L$ directions shown in FIG. 1), the select lever 200 performs a rotational motion about a rotational axis (in an R direction in FIG. 1).

The operations of the shift lever 100 and the select lever 200 will be described in more detail with reference to FIGS. 4 and 5.

Figure 4:
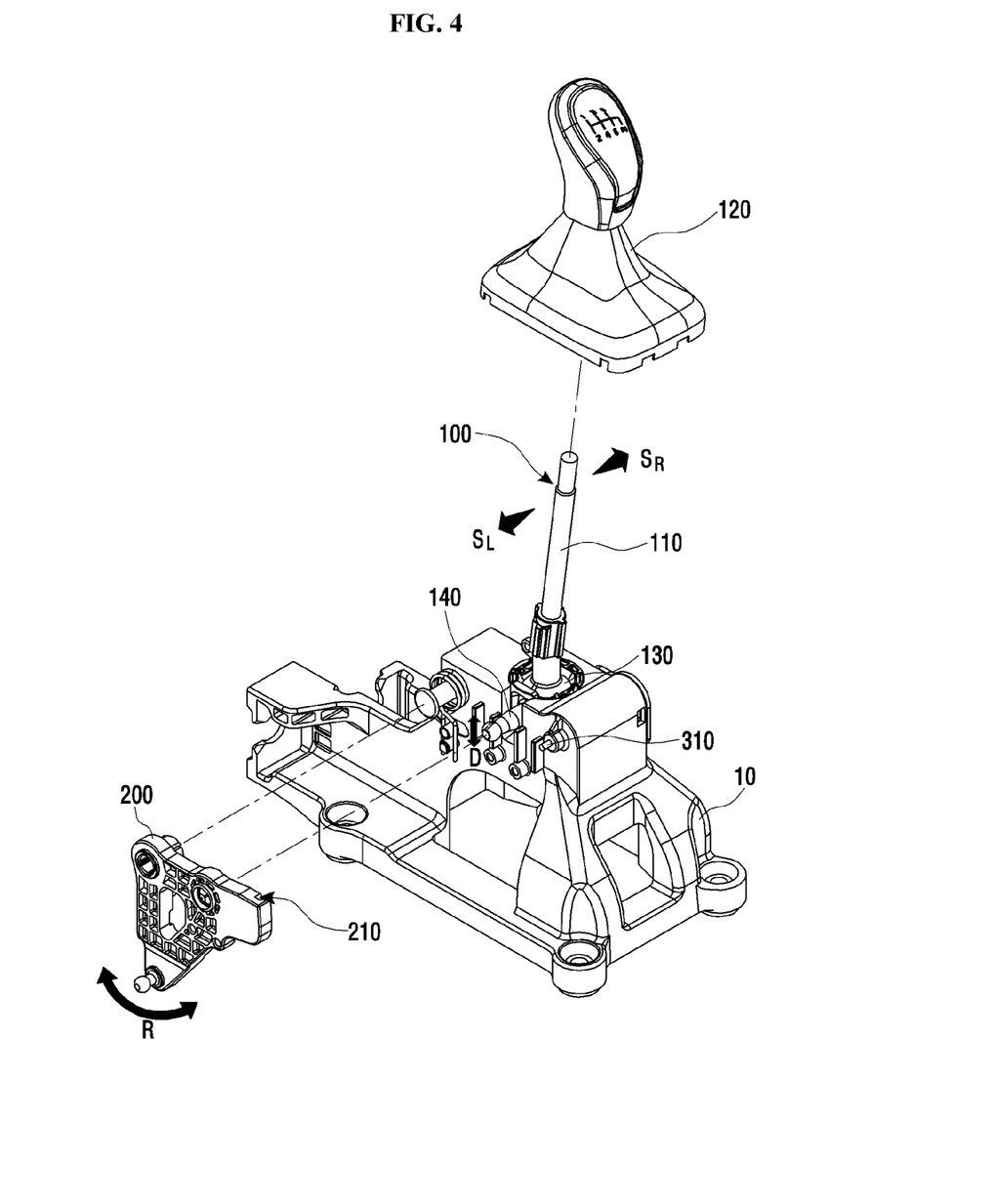
FIG. 4 is an exploded perspective view of the shift control apparatus of a manual transmission according to the embodiment of the present invention.

FIG. 4 is an exploded perspective view of the shift control apparatus of a manual transmission according to the embodiment of the present invention. FIG. 5 is a cross sectional view of the shift control apparatus of a manual transmission according to the embodiment of the present invention.

Figure 5:
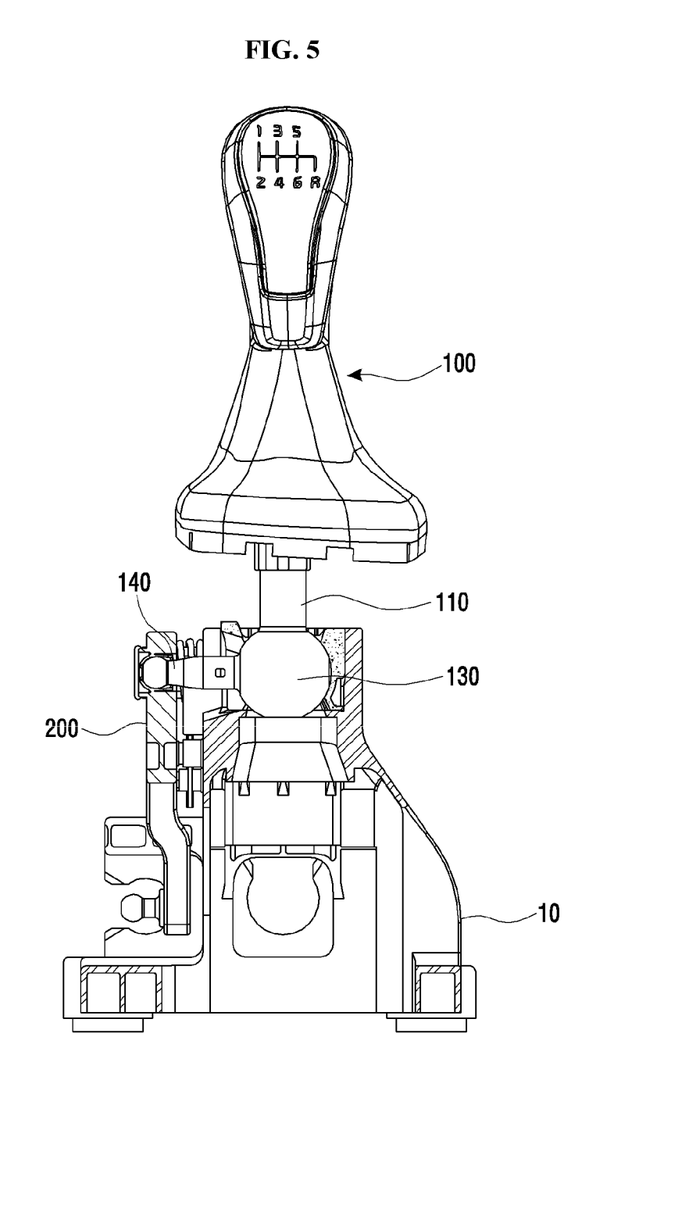
FIG. 5 is a cross sectional view of the shift control apparatus of a manual transmission according to the embodiment of the present invention.

As shown in FIGS. 4 and 5, the shift lever 100 includes a rod 110, a knob 120, a ball shaft 130, and a connecting rod 140.

The knob 120 is provided on one end of the rod 110 for controlling the transmission. The shift pattern is, as shown in FIG. 2, formed in the knob 120. The knob 120 makes it more convenient to control the transmission and may be made of a variety of materials in various shapes.

The ball shaft 130 is connected to the other end of the rod 110. Also, the connecting rod 140 is connected to the other end of the rod 110 perpendicularly to the longitudinal direction of the rod 110. One end of the connecting rod 140 is connected to the ball shaft 130. The other end of the connecting rod 140 is connected to the select lever 200.

The driver holds the knob 120 and moves the shift lever 100 in the select direction (in $S_R$ or $S_L$ direction), the spherical ball shaft 130 connected to the rod 110 performs a rotational motion about the center thereof In response to this, the connecting rod 140 connected to the ball shaft 130 performs a rotational motion on the circumference about the center of the ball shaft 130. The select lever 200 connected to the other end of the connecting rod 140 performs a rotational motion about the rotational axis thereof (in the R direction).

That is, the rotational motion of the select lever 200 is accompanied by the select directional movement of the shift lever 100.

Figure 6:
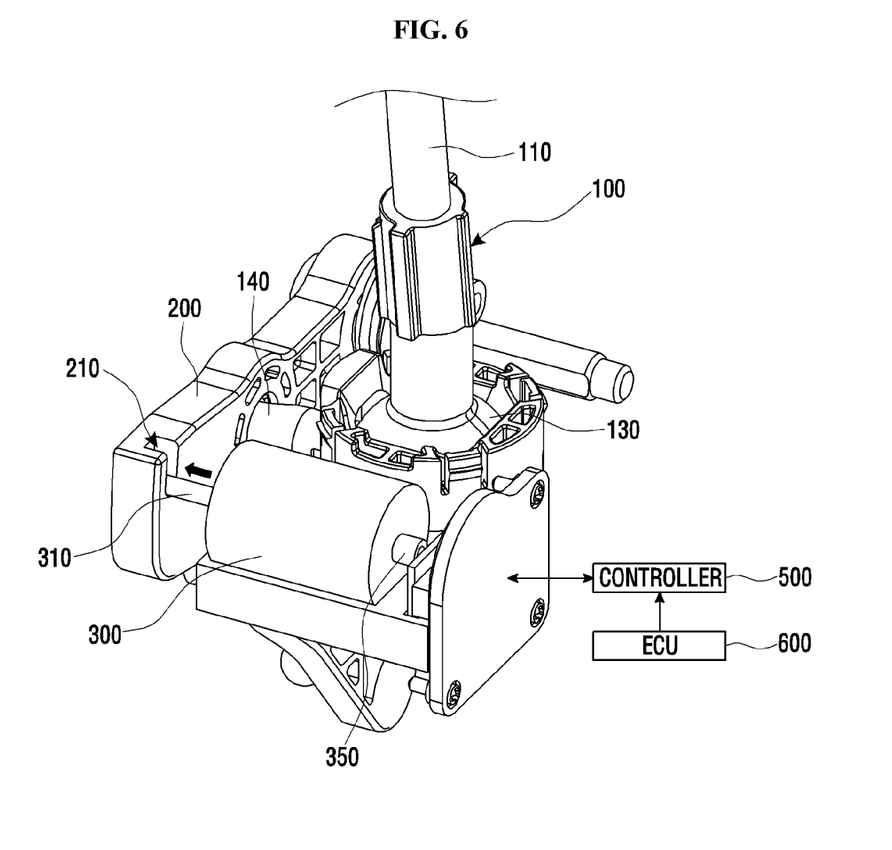
FIG. 6 is a view showing a state where a select lock has been made in the shift control apparatus of a manual transmission according to the embodiment of the present invention.
Figure 7:
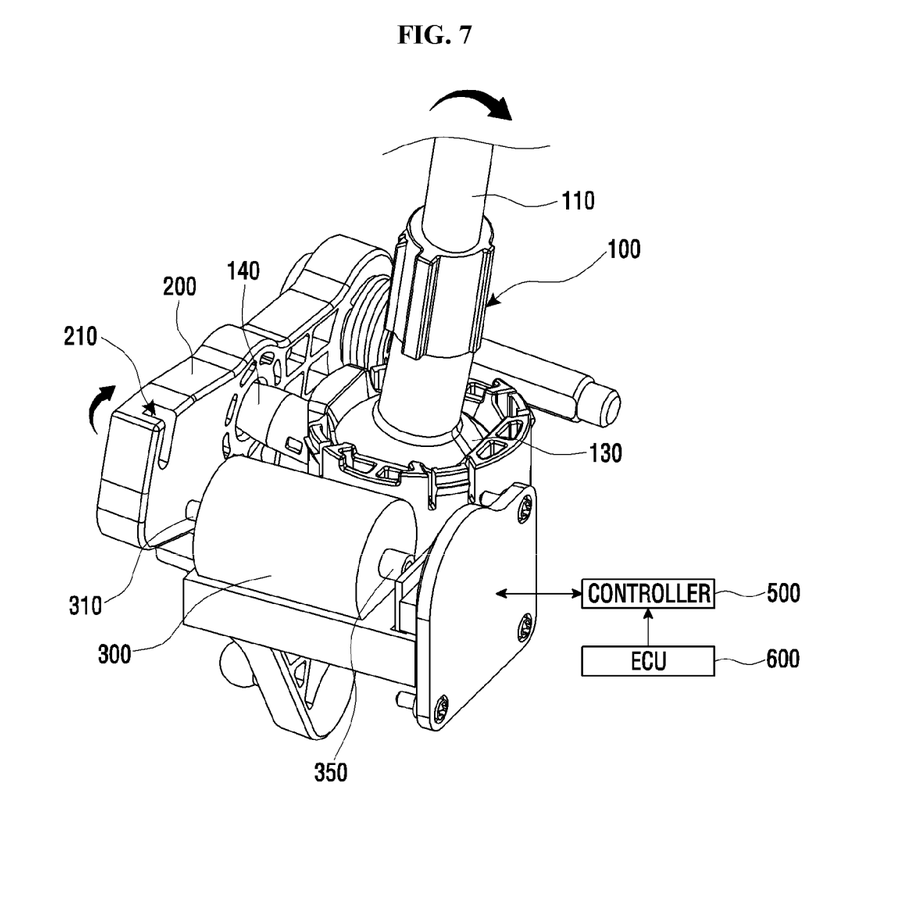
FIG. 7 is a view showing a state where the select lock has been released in the shift control apparatus of a manual transmission according to the embodiment of the present invention.

FIGS. 6 and 7 are views for describing a select lock operation of the shift control apparatus of a manual transmission according to the embodiment of the present invention. Specifically, FIG. 6 is a view showing a state where a select lock has been made in the shift control apparatus of a manual transmission according to the embodiment of the present invention. FIG. 7 is a view showing a state where the select lock has been released in the shift control apparatus of a manual transmission according to the embodiment of the present invention. Here, the select lock operation refers to an operation to block or allow the movement of the shift lever 100 by blocking the movement of the select lever 200.

The shift control apparatus of a manual transmission according to the embodiment of the present invention further includes a select lock unit 300 and a controller 500 as well as the above-described shift lever 100 and the select lever 200.

The select lock unit 300 functions to prevent that the shift lever 100 is shifted to R gear by the mal-operation of the driver while the vehicle travels at a high speed.

As described above, the driver changes the gear shift stage by operating the shift lever 100. Here, only when the shift lever 100 is appropriately moved in the select direction and in the shift direction, the driver can change the gear shift stage into his/her desired gear shift stage.

In the case where the driver moves the shift lever 100 from the third gear/fourth gear to the fifth gear/sixth gear, there occurs a problem when the shift lever 100 is moved to the R gear position beyond the fifth gear position/sixth gear position by the mal-operation of the driver. In this case, an excessive force is added and thus overload is generated in the transmission.

When the shift lever 100 is moved from the third gear/fourth gear to the fifth gear/sixth gear, the select lock unit 300 according to the embodiment of the present invention blocks the shift lever 100 from moving to the R gear position in the select direction, thereby preventing in advance the above problem.

The select lock unit 300 includes a solenoid composed of a permanent magnet and a coil, and a current supply unit for supplying current to the coil of the solenoid. Here, the permanent magnet is fixed to the shaft either directly or indirectly.

The controller 500 controls the current which is supplied to the select lock unit 300 and produce a magnetic field, and thus, moves the shaft provided within the solenoid.

Particularly, the controller 500 performs the above operation on the basis of the vehicle's speed or the gear shift stage. That is, on the basis of the vehicle's speed or the gear shift stage, the controller 500 controls the current which is supplied to the select lock unit 300 and moves the shaft provided within the solenoid, and thus, causes the select lock unit 300 to perform or release the select lock operation.

First, the select lock operation of the select lock unit 300 will be described based on the speed of the vehicle. The controller 500 controls the select lock unit 300 on the basis of the speed of the vehicle.

Specifically, when the speed of the vehicle is in a speed range corresponding to the third gear or the fourth gear (e.g., 40 km/h to 80 km/h), the controller 500 causes the select lock unit 300 to block the shift lever 100 from moving in the select direction, in order to prevent the shifting lever from being moved to R gear by the mal-operation of the driver.

The controller 500 may receive information on the speed of the vehicle from an electronic control unit (ECU) 600.

The electronic control unit 600 receives information from various sensors and is configured to operate various circuits and systems. In order that the engine is operated with the optimal performance in response to all the operation states of the vehicle, the electronic control unit 600 receives input signals from the various sensors and calculates an optimal amount of fuel injection, fuel injection timing, ignition timing, air amount, etc., which are based on each of the driving conditions and have an important influence on the drivability of the vehicle, exhaust gas, fuel efficiency, etc. Through this, the controller 500 functions to control the engine through an actuator such as an injector, ignition coil, etc. The electronic control unit 600 can sense the speed of the vehicle through various sensors.

The select lock operation of the select lock unit 300 will be described based on the gear shift stage. When the gear shift stage is the third gear or the fourth gear, the controller 500 causes the select lock unit 300 to block the shift lever 100 from moving in the select direction, in order to prevent the shifting lever from being moved to R gear by the mal-operation of the driver.

Here, a separate device for detecting information on the gear shift stage may be further included. The gear shift detection device (not shown) can detect the change of the gear shift in real time by using a physical method and an electronic method. Since a variety of known methods can be used in this, a detailed description thereof will be omitted.

FIG. 6 is a view showing a state where the select lock has been made in the shift control apparatus of a manual transmission according to the embodiment of the present invention.

As the shift lever 100 moves in the select direction, the select lever 200 performs a rotational motion about the rotational axis thereof. However, when the select lock is made, a shaft 310 of the select lock unit 300 comes to protrude, and the protruding shaft 310 is inserted into a locking groove 210 formed in the select lever 200. As a result, the rotation of the select lever 200 is blocked.

Therefore, the driver is not able to move the shift lever 100 to the R gear position.

In other situations other than the above situation, the controller 500 causes the select lock unit 300 to release the select lock. Referring to FIG. 7 showing the state where the select lock has been released, the shaft 300 of the select lock unit 300 is restored to the original state, and thus, the select lever 200 can freely rotate again.

As a result, the driver is able to move the shift lever 100 to the R gear position in the select direction.

Hereafter, the structure and operation of the select lock unit 300 and the operation of the controller 500 controlling the operation of the select lock unit 300 will be described with reference to FIGS. 8 and 9.

Figure 8:
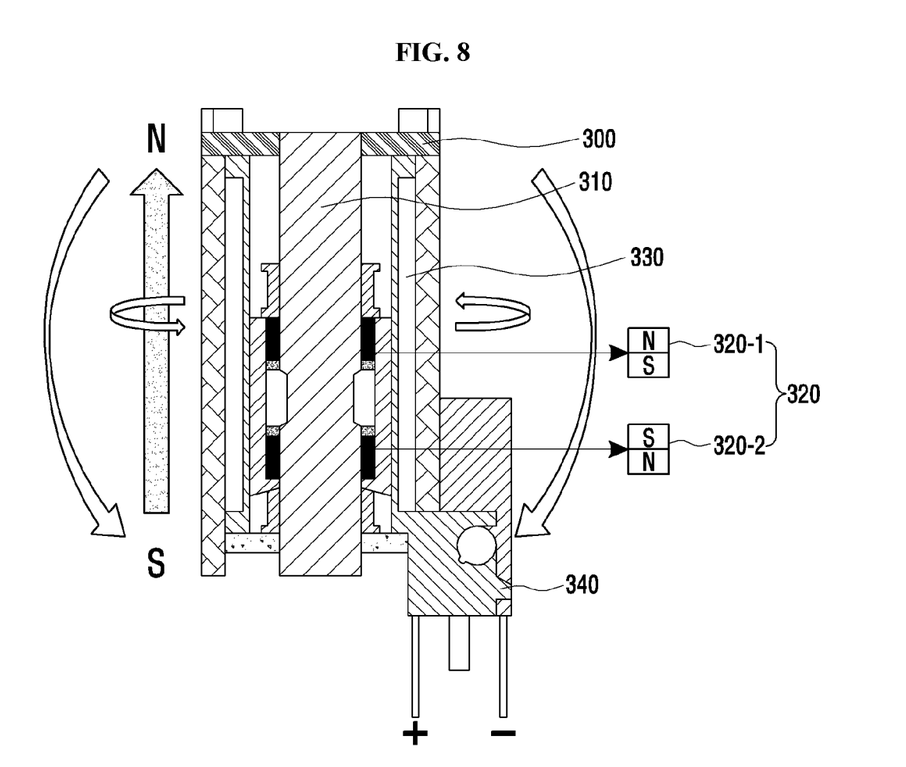
FIG. 8 is a configuration view for describing the operation of solenoid of the shift control apparatus of a manual transmission according to the embodiment of the present invention.
Figure 9:
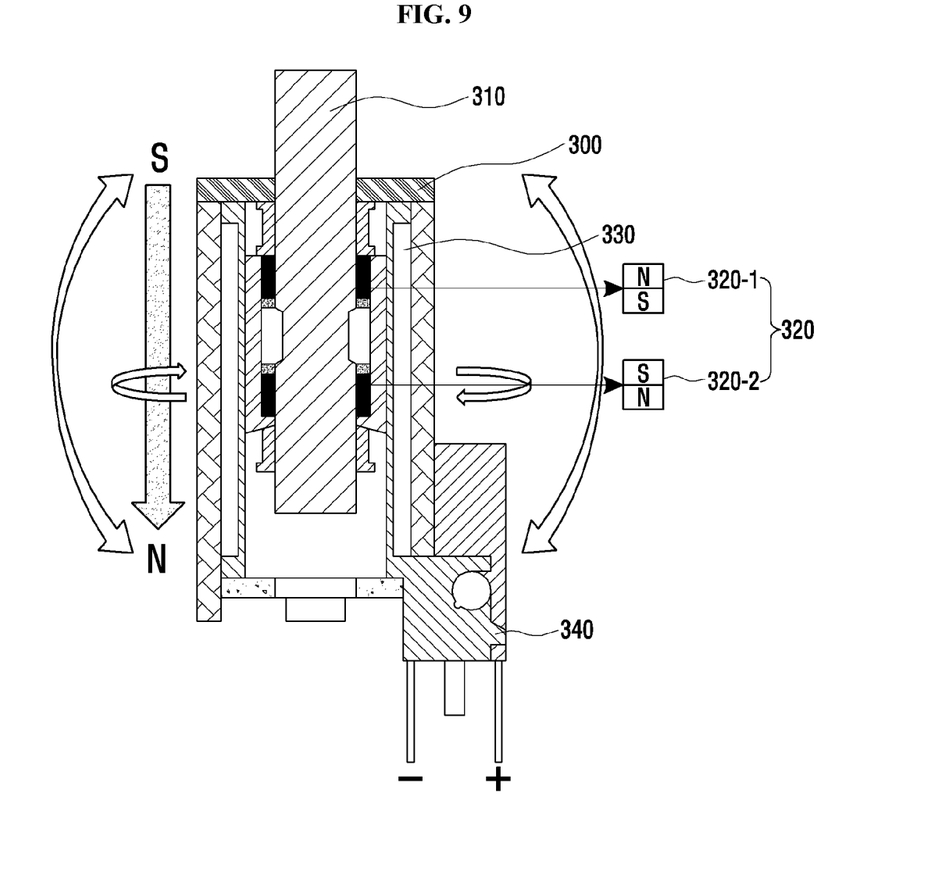
FIG. 9 is a configuration view for describing the operation of a solenoid of the shift control apparatus of a manual transmission according to the embodiment of the present invention.

The select lock unit 300 which is one component of the shift control apparatus of a manual transmission according to the embodiment of the present invention includes, as shown in FIGS. 8 and 9, the shaft 310, a permanent magnet 320, and a coil 330. A current supply unit 340 is connected to the coil 330. The current supply unit 340 supplies the current to the coil 330.

The permanent magnet 320 is fixed to the shaft 310. In the embodiment of the present invention, a first permanent magnet 320-1 and a second permanent magnet 320-2 are fixed in the longitudinal direction of the shaft 310 in such a manner as to generate a repulsive force to each other.

That is to say, as shown in FIGS. 8 and 9, a magnetization direction of the first permanent magnet 320-1 is opposite to a magnetization direction of the second permanent magnet 320-2. Also, one permanent magnet may be used instead of the two permanent magnets.

When the current is applied to the coil 330, a magnetic field is formed around the select lock unit 300. FIG. 8 shows that an area where the first permanent magnet 320-1 is located within the solenoid is magnetized to N pole and an area where the second permanent magnet 320-2 is located within the solenoid is magnetized to S pole.

Here, since a repulsive force acts between the area magnetized to N pole and the N pole of the first permanent magnet 320-1, they push each other. Contrary to this, since an attractive force acts between the area magnetized to S pole and the N pole of the second permanent magnet 320-2, they pull each other.

Therefore, the permanent magnets 320-1 and 320-2 move, and then the shaft 310 to which the permanent magnets 320-1 and 320-2 have been fixed move together. In FIG. 8, the shaft 310 moves in the S pole magnetized direction, that is, in a direction further away from the select lever 200.

When the shaft 310 moves, as shown in FIG. 8, in a direction further away from the select lever 200, the select lock is released. In other words, since the shaft 310 comes out of the locking groove 210 of the select lever 200, the select lever 200 is able to freely rotate. This means that the driver is able to move the shift lever 100 to the R gear position in the select direction.

Regarding the select lock release state, when the controller 500 determines that the current speed of the vehicle is not a speed corresponding to the third gear or fourth gear or the gear shift stage does not correspond to the third gear or fourth gear, the controller 500 controls the select lock unit 300 to cause the shaft 310 not to protrude.

Contrary to this, when the controller 500 determines that the current speed of the vehicle is a speed corresponding to the third gear or fourth gear or the gear shift stage corresponds to the third gear or fourth gear, the controller 500 controls the select lock unit 300 to creates the select lock state where the shaft 310 protrudes.

The select lock state can be made by supplying the current to the coil 330 of the select lock unit 300 in a direction opposite to the direction in which the current has been applied. In other words, the controller 500 supplies the current in a direction opposite to that of FIG. 8, and thus, forming the magnetic field within the solenoid in the opposite direction. This operation is shown in FIG. 9.

The direction in which the current flows through the coil 330 in FIG. 9 is opposite to the current direction shown in FIG. 8. Due to the opposite current direction, the opposite magnetic field is formed within the solenoid. Meanwhile, since the structure of the shaft 310 is the same as that of the permanent magnet 320-1 and 320-2, the permanent magnets 320-1 and 320-2 move in a direction opposite to the shaft 310, and thus, the shaft 310 also moves in a direction opposite to that of FIG. 8.

Specifically, an attractive force acts between the area of the solenoid, which has been magnetized to S pole, and the N pole of the first permanent magnet 320-1. A repulsive force acts between the area of the solenoid, which has been magnetized to N pole, and the N pole of the second permanent magnet 320-2.

Therefore, the permanent magnets 320-1 and 320-2 move upward in FIG. 9 and the shaft 310 moves together and protrudes outward.

When the shaft 310 moves and protrudes in the outward direction of the select lock unit 300, the shaft 310 is, as shown in FIG. 6, inserted into the locking groove 210 of the select lever 200.

As a result, the rotation of the select lever 200 is blocked. This means that the driver is not able to move the shift lever 100 to the R gear position in the select direction.

As such, the controller 500 controls the select lock unit 300 on the basis of the vehicle's speed and the gear shift stage, thereby blocking or allowing the movement of the shift lever 100 to R gear. Accordingly, the driver cannot move the shift lever 100 to R gear while the vehicle travels at a high speed, so that it is possible to prevent failures or accidents in advance.

Figure 10:
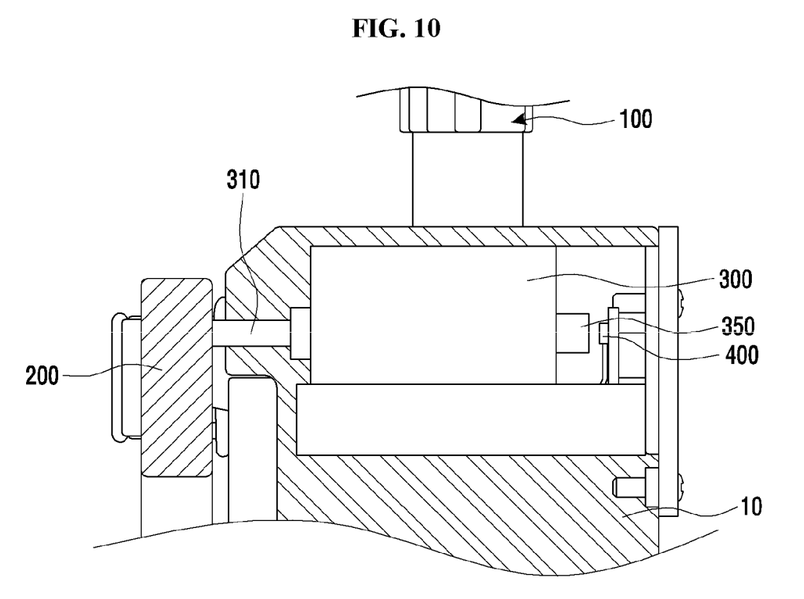
FIG. 10 is a partial schematic view showing a main configuration of the shift control apparatus of a manual transmission according to the embodiment of the present invention.

FIG. 10 is a partial schematic view showing an enlarged configuration of the shift control apparatus of a manual transmission according to the embodiment of the present invention. In FIG. 10, the functions and structures of the base bracket 10, the shift lever 100, the select lever 200, the select lock unit 300, and the shaft 310 are the same as the above description. Therefore, repetitive description thereof will be omitted.

However, the shift control apparatus of a manual transmission according to the embodiment of the present invention may further include a position sensing magnet 350 and a magnetic field sensor 400.

The position sensing magnet 350 may be provided on the end of the shaft 310 which is one component of the select lock unit 300.

By the operation of the select lock unit 300 according to the control of the controller 500, the magnetic field sensor 400 functions to sense whether the select directional movement of the shift lever 100 is limited or not.

More specifically, on the basis of the magnetic field change depending on the distance change of the position sensing magnet 350 provided on the end of the shaft 310, the magnetic field sensor 400 senses the position of the shaft 310. As a result, it is possible to recognize whether the select lock is made or released.

The magnetic field sensor 400 may be composed of a hall integrated circuit (IC). The hall IC is a magnetic sensor which measures the direction or intensity of the magnetic field by using a hall effect.

The magnetic field sensor 400 is located apart from the position sensing magnet 350 by a certain distance on the same line. Through the intensity of the magnetic field, the magnetic field sensor 400 measures the distance change of the position sensing magnet 350 depending on the movement of the shaft 310.

In accordance with the above-described principle, the magnetic field sensor 400 can determine whether the select lock has been made or not.

In the meantime, the controller 500 can efficiently control the select lock unit 300 by using information on the select lock sensed by the magnetic field sensor 400.

Also, information on the select lock state sensed by the magnetic field sensor 400 (information on the position of the shaft 310) is transferred to the electronic control unit 600 and may be usefully used in driving the vehicle.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A shift control apparatus of a manual transmission, the shift control apparatus comprising:
    a shift lever which is rotatable in a shift direction and in a select direction;
    a select lever which is connected to the shift lever;
    a select lock unit which comprises a shaft for limiting the select directional rotation of the shift lever; and
    a controller which controls the select lock unit to limit the select directional rotation of the shift lever on the basis of a speed of a vehicle,
    wherein the shift lever comprises a rod, a knob at one end of the rod, and a connecting rod,
    wherein when a driver holds the knob and moves the shift lever, the shift lever rotates about a center of rotation located on another end of the rod,
    wherein one end of the connecting rod is extended from the other end of the rod at the center of the rotation, and perpendicular to a longitudinal direction of the rod and in a select direction,
    wherein a connecting portion is disposed on the other end of the connecting rod,
    wherein the select lever is coupled to the connecting portion in such a manner as to rotate in the select direction,
    wherein when the shift lever rotates in the shift direction, the select lever does not rotate,
    wherein when the shift lever rotates in the select direction, the select lever rotates about the center of the rotation,
    wherein the select lever comprises a locking groove,
    wherein the locking groove has one end that is opened and another end that is closed,
    wherein when the speed of the vehicle is in a predetermined speed range, the controller inserts the shaft into the locking groove,
    wherein the select direction comprises a first select direction and a second select direction,
    wherein when the shift lever rotates in the first select direction, rotation of the select lever in the first select direction is not limited through the opened end of the locking groove, and
    wherein when the shift lever rotates in the second select direction, rotation of the select lever in the second select direction is limited by the closed end of the locking groove.

2. The shift control apparatus of a manual transmission of claim 1, wherein the predetermined speed range corresponds to a third gear or a fourth gear.

3. The shift control apparatus of a manual transmission of claim 1, wherein the select lock unit comprises a solenoid which comprises a permanent magnet fixed to the shaft, and a coil surrounding a circumference of the shaft in a cylindrical shape, and wherein the controller controls a current flowing through the coil and changes a polarity of a magnetic field formed in the solenoid, so that the permanent magnet fixed to the shaft is moved.

4. The shift control apparatus of a manual transmission of claim 1, further comprising a magnetic field sensor which senses whether the select directional rotation of the shift lever is limited or not.

5. The shift control apparatus of a manual transmission of claim 4, wherein the shaft comprises a magnet provided on an end thereof, and wherein the magnetic field sensor senses a position of the shaft on the basis of a magnetic field of the magnet.

6. The shift control apparatus of a manual transmission of claim 4, wherein the magnetic field sensor is composed of a hall integrated circuit (IC).

7. The shift control apparatus of a manual transmission of claim 1, wherein the controller receives information on the speed of the vehicle from an electronic control unit (ECU).

8. The shift control apparatus of a manual transmission of claim 1, wherein the connecting portion has a circular cross section perpendicular to the select direction.

* * * * *